(12) United States Patent
Atsumi

(10) Patent No.: US 12,224,562 B2
(45) Date of Patent: Feb. 11, 2025

(54) PEELING DEVICE FOR RESIN LAYER COATING RECTANGULAR WIRE

(71) Applicant: ESSEX FURUKAWA MAGNET WIRE JAPAN CO., LTD., Tokyo (JP)

(72) Inventor: Keisuke Atsumi, Tokyo (JP)

(73) Assignee: ESSEX FURUKAWA MAGNET WIRE JAPAN CO., LTD., Tokyo (JP)

( * ) Notice: Subject to any disclaimer, the term of this patent is extended or adjusted under 35 U.S.C. 154(b) by 465 days.

(21) Appl. No.: 17/536,162

(22) Filed: Nov. 29, 2021

(65) Prior Publication Data
US 2022/0102950 A1  Mar. 31, 2022

Related U.S. Application Data

(63) Continuation of application No. PCT/JP2021/022089, filed on Jun. 10, 2021.

(30) Foreign Application Priority Data

Sep. 30, 2020 (JP) ................. 2020-165521

(51) Int. Cl.
*H02G 1/12* (2006.01)
*H01F 41/04* (2006.01)

(52) U.S. Cl.
CPC ........... *H02G 1/1253* (2013.01); *H01F 41/04* (2013.01); *Y10T 29/5313* (2015.01)

(58) Field of Classification Search
CPC ...... H02G 1/1253; H02G 1/1285; H02G 1/12; Y10T 29/5313

(Continued)

(56) References Cited

U.S. PATENT DOCUMENTS 3,748,932 A  7/1973 Neiman et al.
4,106,377 A  8/1978 Owen, Jr. et al.
(Continued)

FOREIGN PATENT DOCUMENTS

CN  102290748 A  12/2011
CN  103021559 A  4/2013
(Continued)

OTHER PUBLICATIONS

International Search Report (PCT/ISA/210) issued in PCT/JP2021/022089, dated Aug. 31, 2021.
(Continued)

*Primary Examiner* — Thiem D Phan
(74) *Attorney, Agent, or Firm* — Birch, Stewart, Kolasch & Birch, LLP

(57) ABSTRACT

A peeling device for a resin layer coating a rectangular wire in which an outer side of a metal conductor having a rectangular shape in cross section is coated with the resin layer, including a processing blade configured to peel off the resin layer, a jig configured to hold the rectangular wire, and a position detection means configured to detect a position of a cutting edge of the processing blade with respect to a surface of the metal conductor, in which the cutting edge of the processing blade is caused to penetrate into a predetermined thickness position of the resin layer, and the processing blade and the rectangular wire are relatively moved in a longitudinal direction of the rectangular wire without contact of the cutting edge with the metal conductor to perform treatment of peeling off the resin layer.

15 Claims, 12 Drawing Sheets

(58) Field of Classification Search
USPC .................................. 29/729, 745, 759, 825
See application file for complete search history.

(56) References Cited

U.S. PATENT DOCUMENTS

| | | | | |
|---|---|---|---|---|
| 11,018,482 B2* | 5/2021 | Oka | ..................... | H02G 1/1285 |
| 2018/0083428 A1* | 3/2018 | Shigematsu | ......... | H02G 1/1285 |

FOREIGN PATENT DOCUMENTS

| | | | |
|---|---|---|---|
| CN | 103151735 A | | 6/2013 |
| CN | 107845983 A | | 3/2018 |
| CN | 109842059 A | | 6/2019 |
| EP | 2 693 580 B1 | | 7/2018 |
| EP | 3 236 550 B1 | | 2/2020 |
| JP | 5-29225 U | | 4/1993 |
| JP | 5-111123 A | | 4/1993 |
| JP | 6-253430 A | | 9/1994 |
| JP | 9-56037 A | | 2/1997 |
| JP | 2002-209319 A | | 7/2002 |
| JP | 2008-61460 A | | 3/2008 |
| JP | 2008061460 | * | 3/2008 |
| JP | 2011-234447 A | | 11/2011 |
| JP | 2011234447 | * | 11/2011 |
| JP | 2019-221051 A | | 12/2019 |

OTHER PUBLICATIONS

Written Opinion of the International Searching Authority (PCT/ISA/237) issued in PCT/JP2021/022089, dated Aug. 31, 2021.
Chinese Office Action and Search Report for corresponding Chinese Application No. 202180003806.4, dated Nov. 1, 2023, with an English translation.
Chinese Office Action and Search Report for corresponding Chinese Application No. 202180003806.4, dated Mar. 27, 2024, with English translation.
Extended European Search Report for corresponding European Application No. 21809902.6, dated Oct. 2, 2024.

* cited by examiner

{FIG. 1}
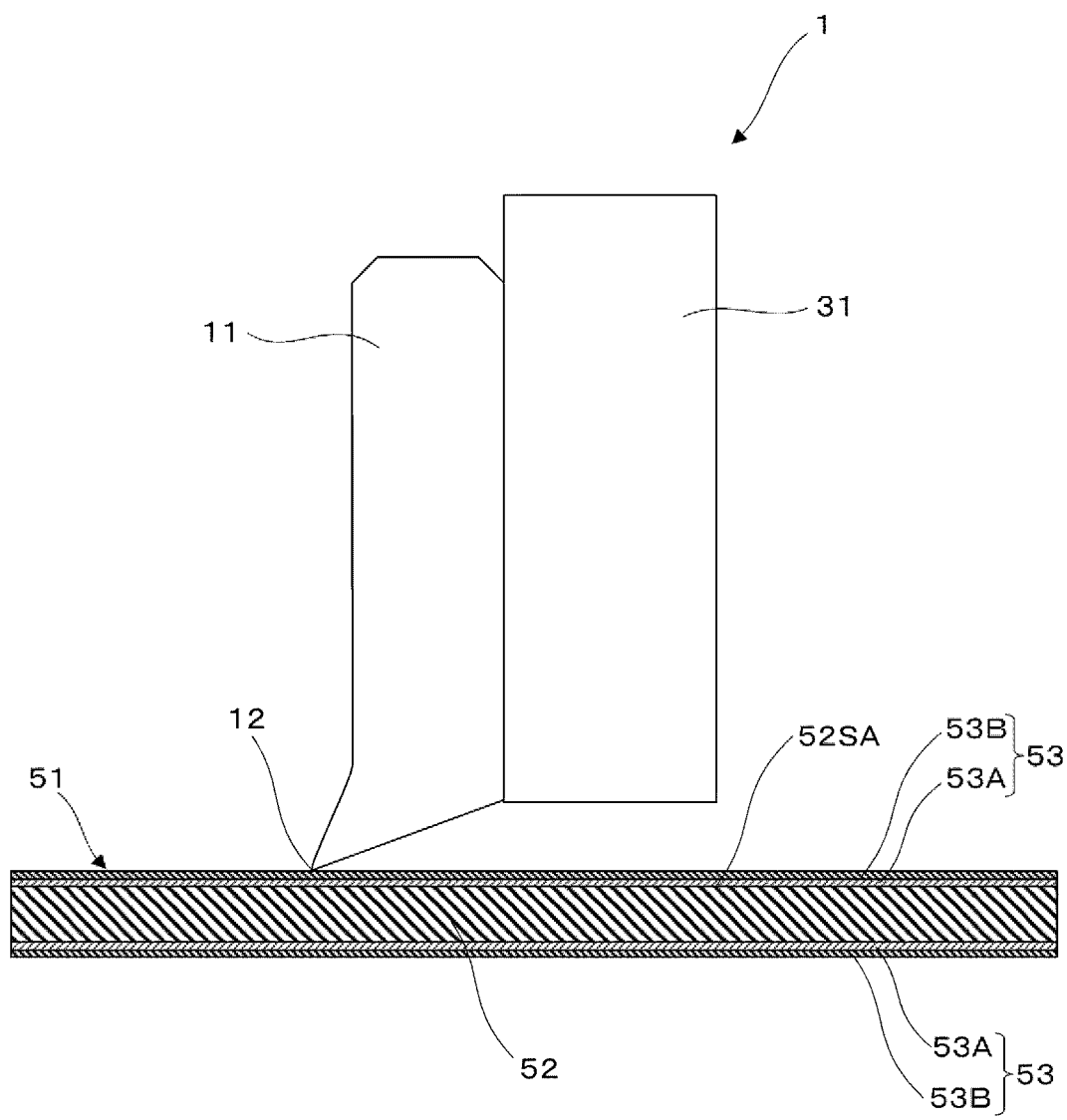

{FIG. 2}
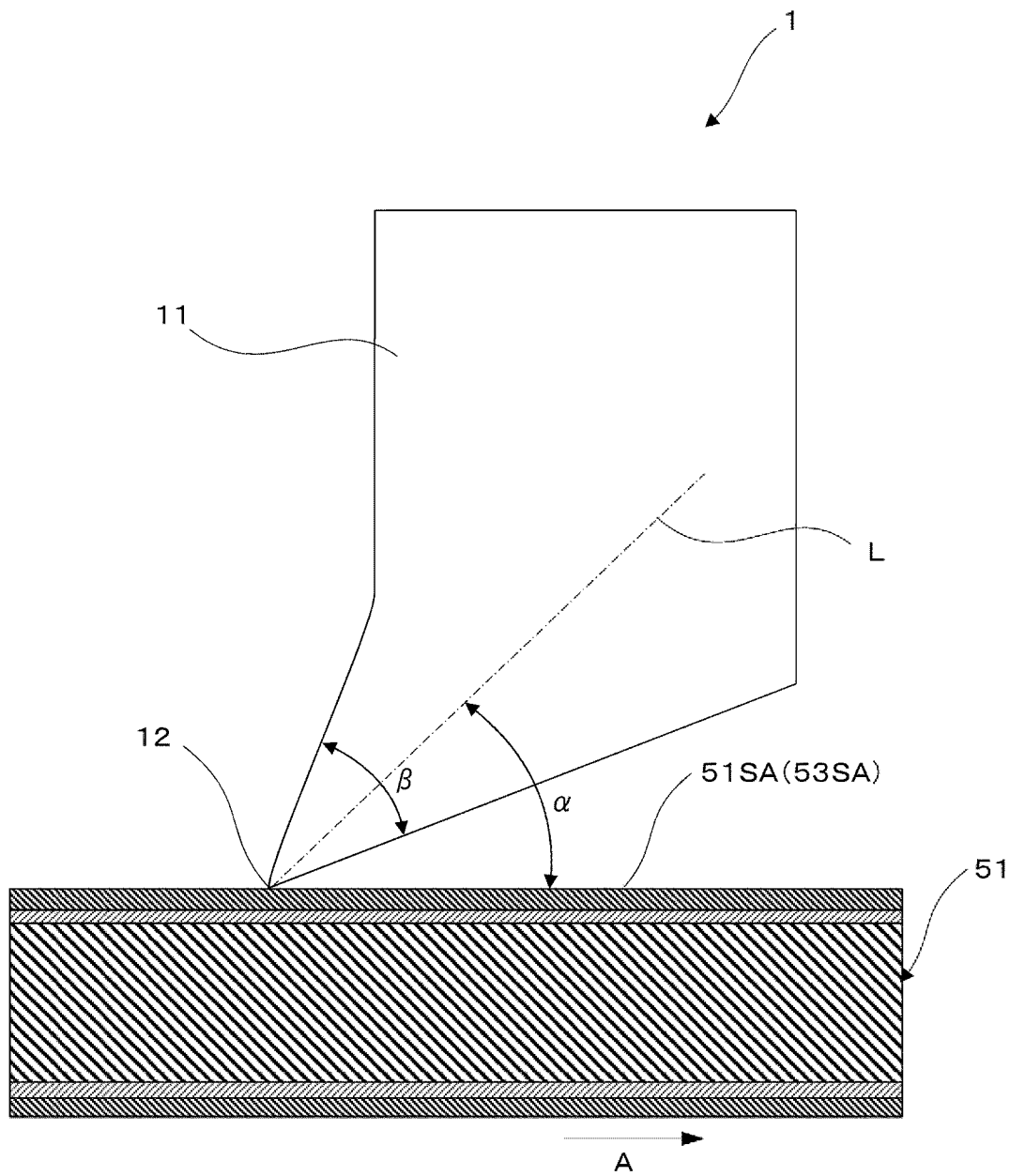

{FIG. 3}
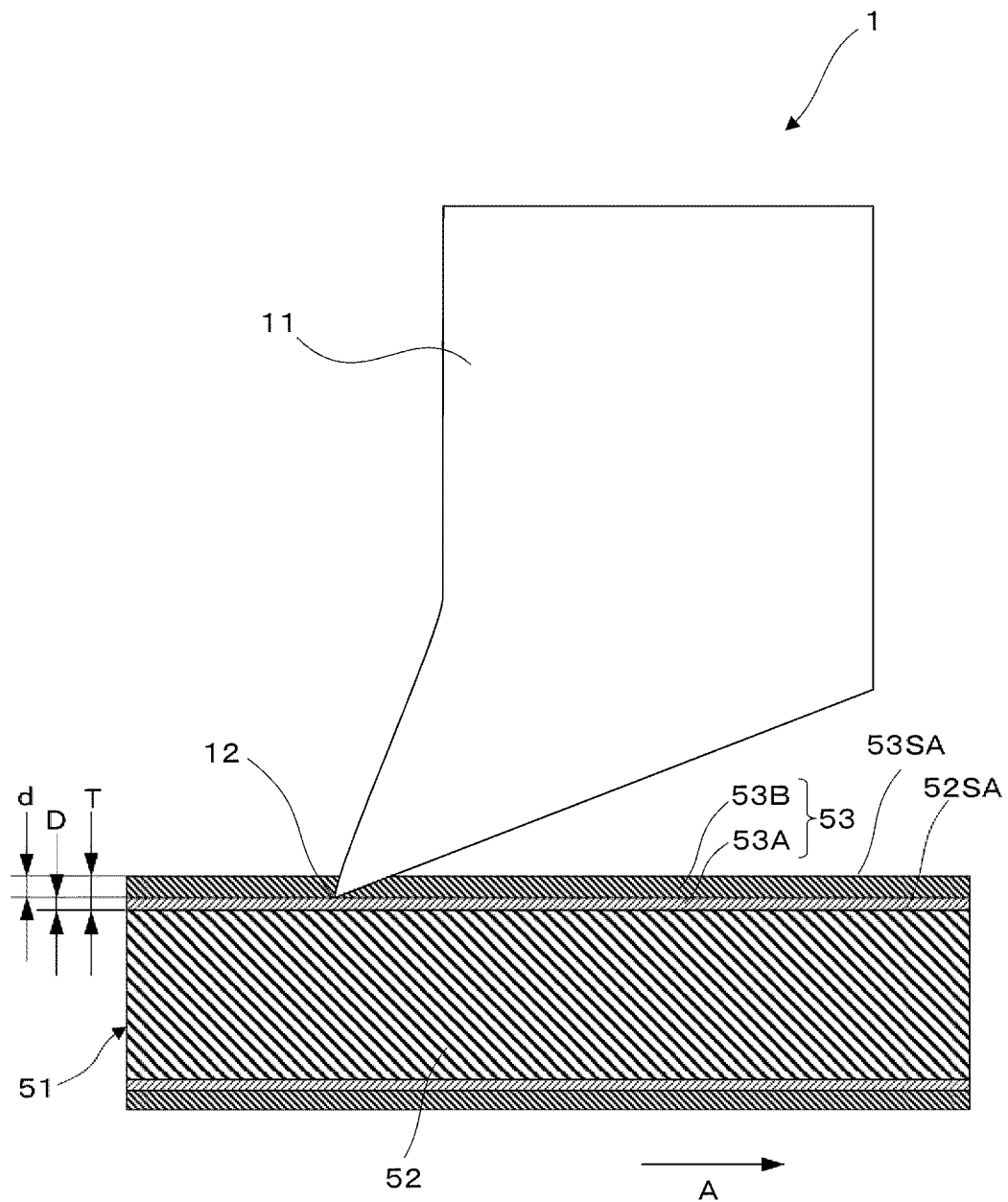

{FIG. 4}
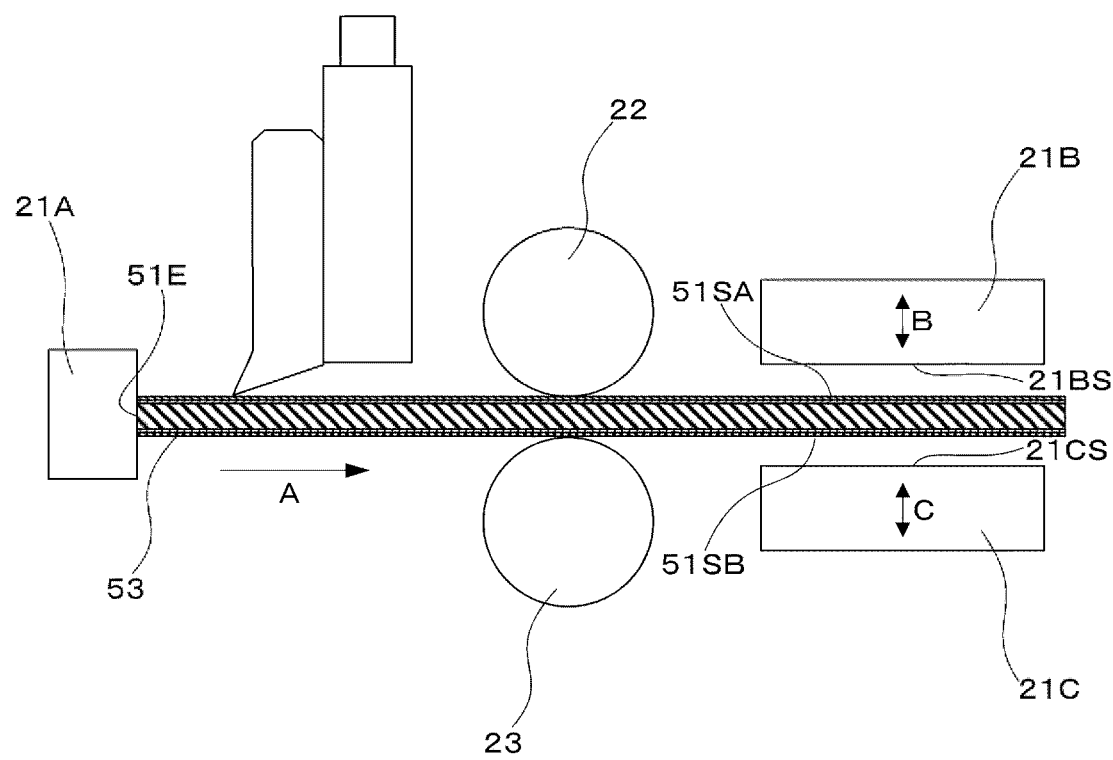

{FIG. 5}
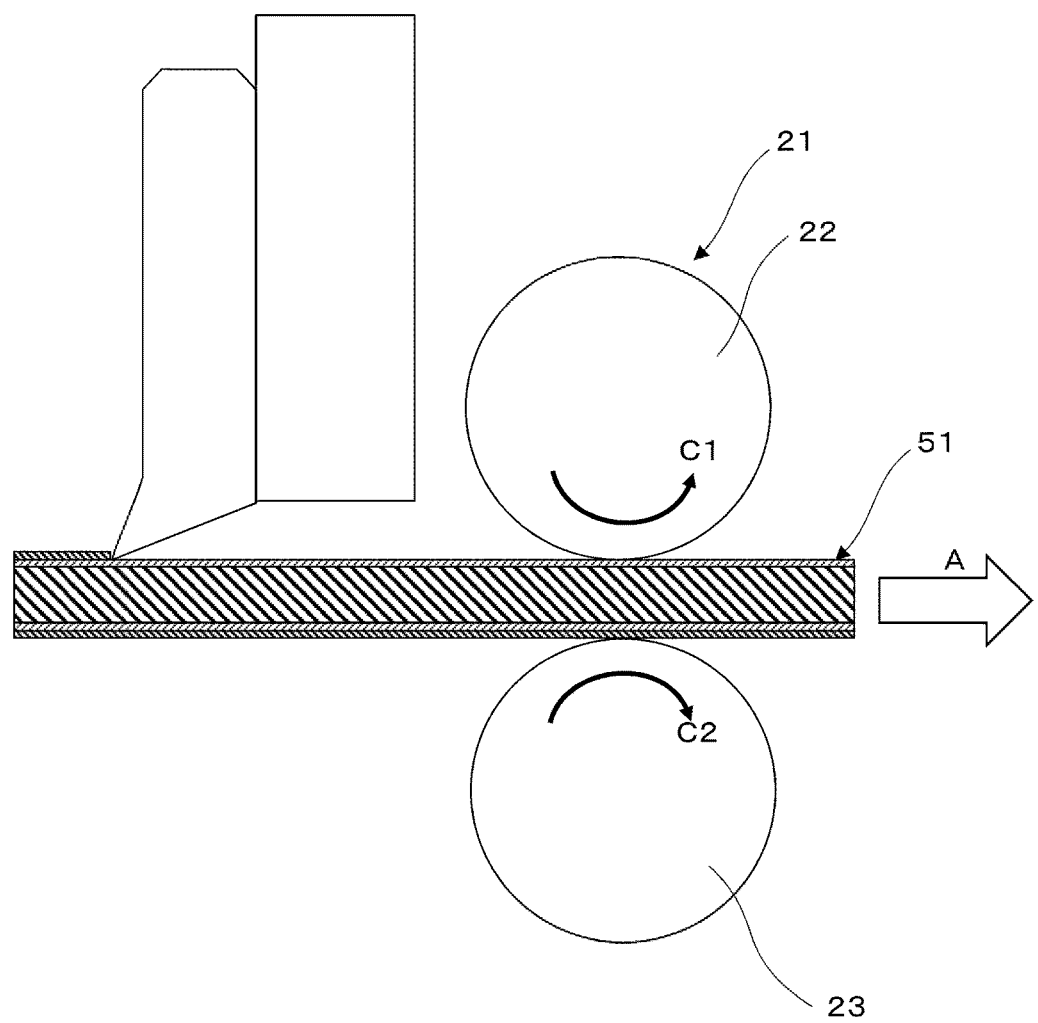

{FIG. 6}
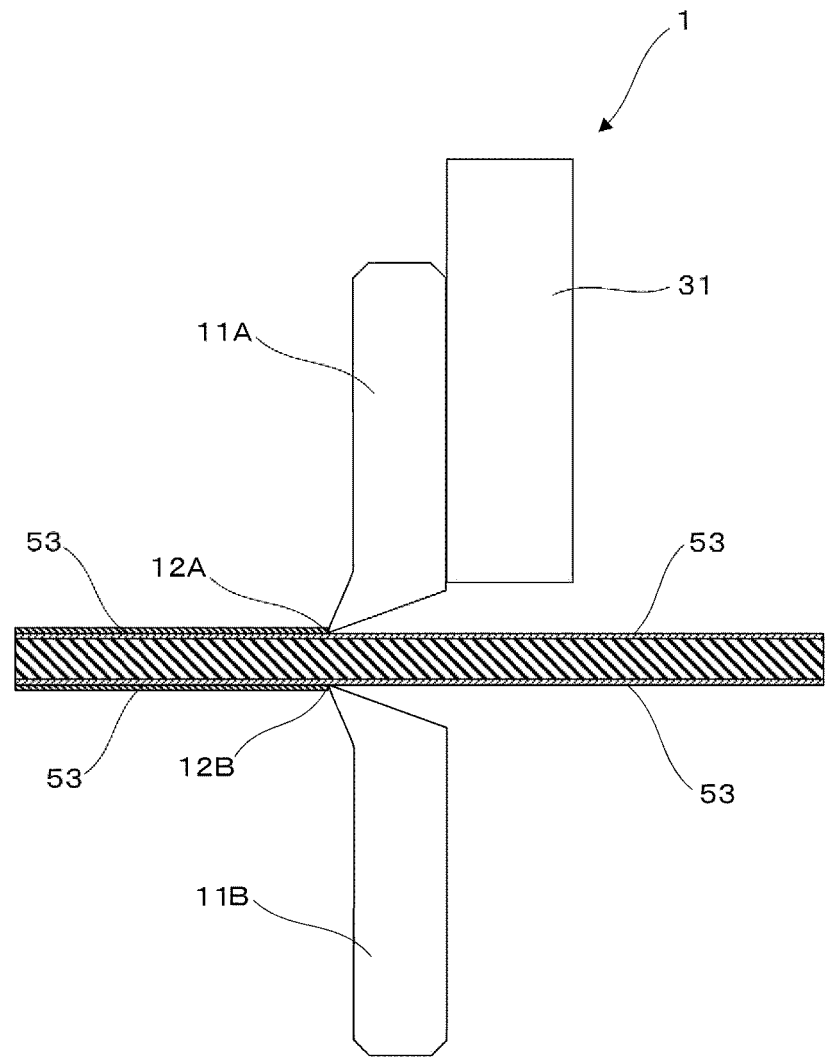
{FIG. 7}
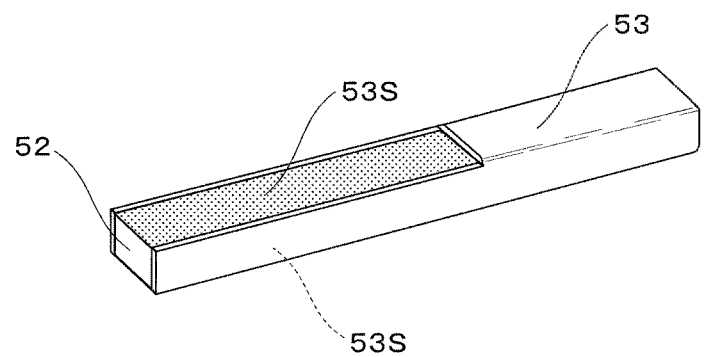

{FIG. 8}
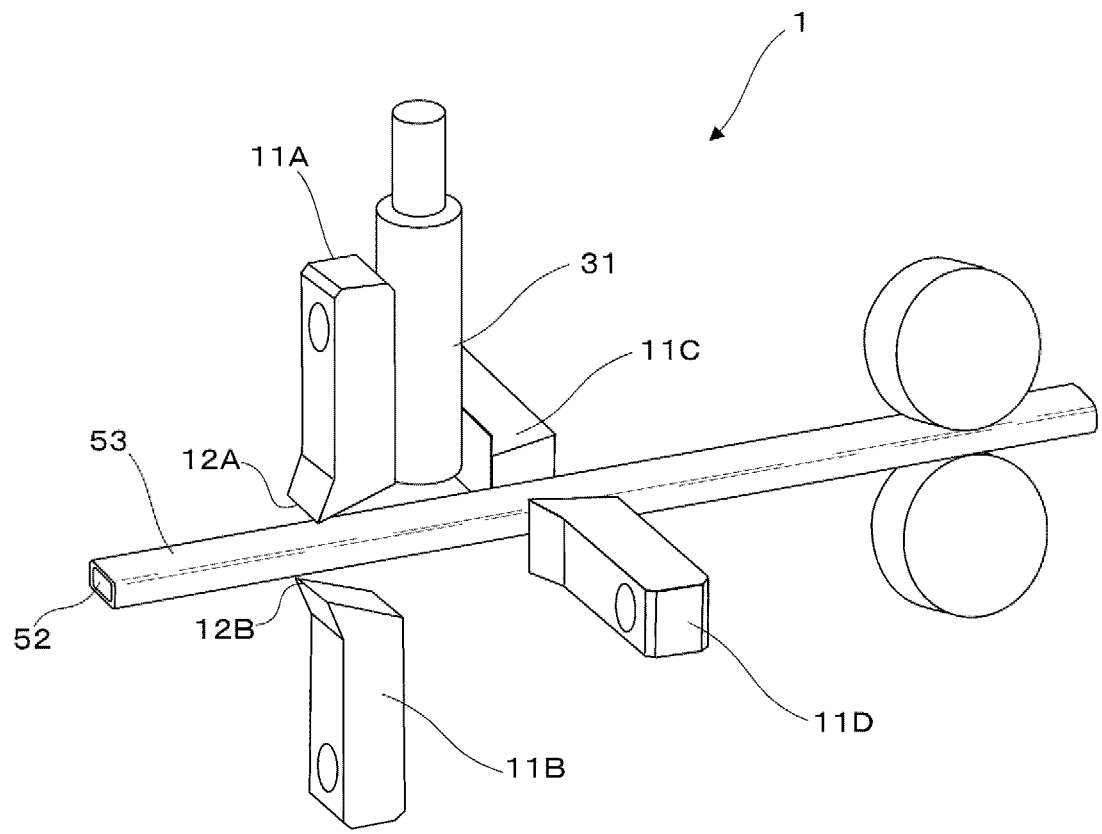
{FIG. 9}
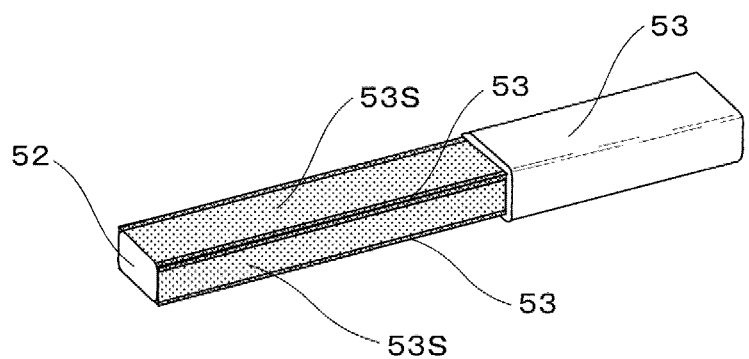

{FIG. 10}
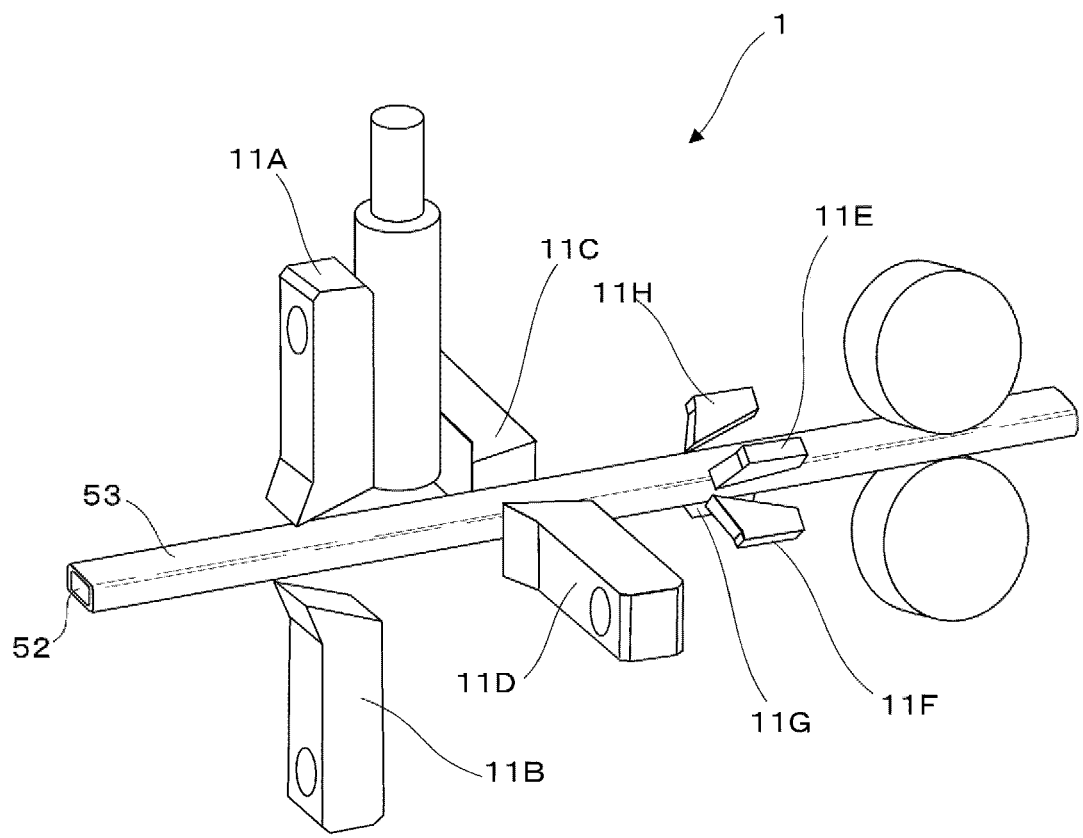
{FIG. 11}
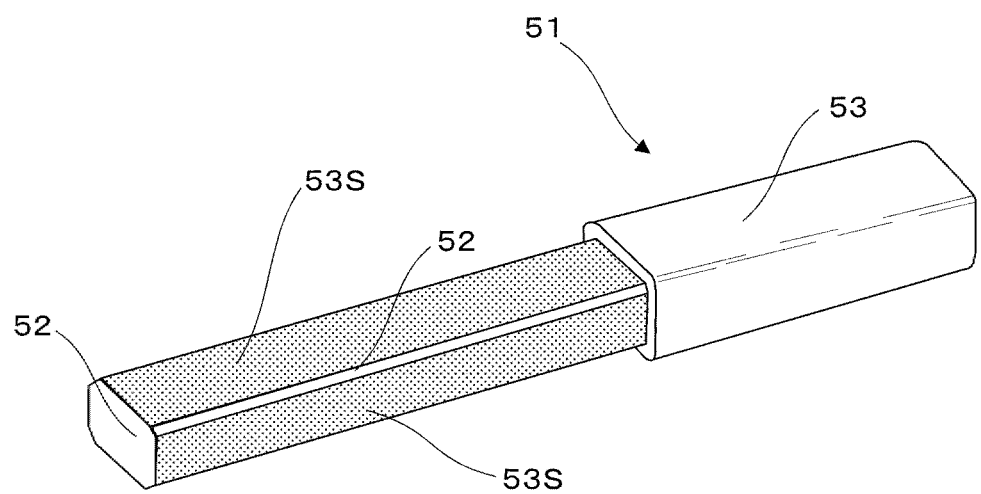

{FIG. 12}
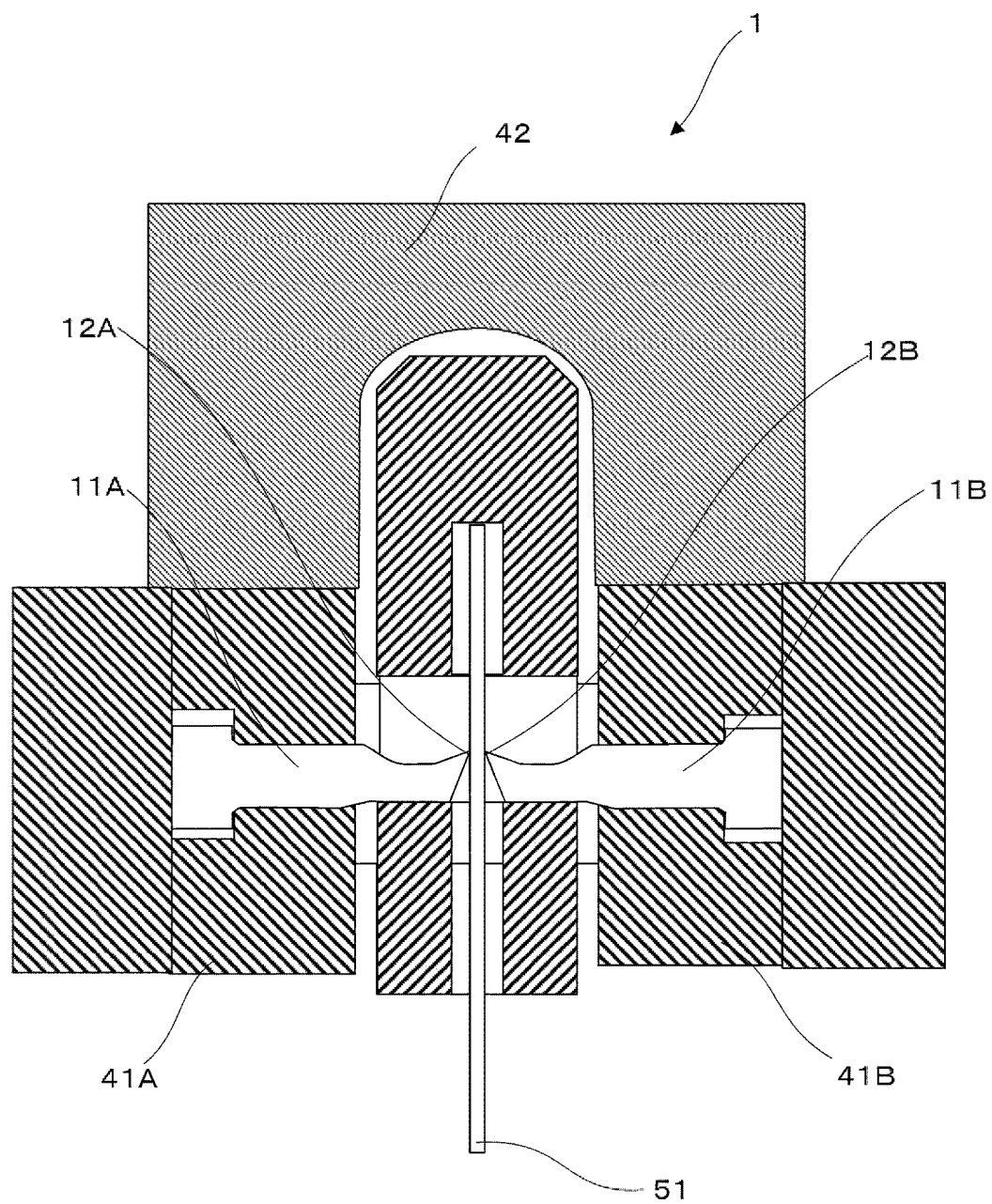

{FIG. 13}
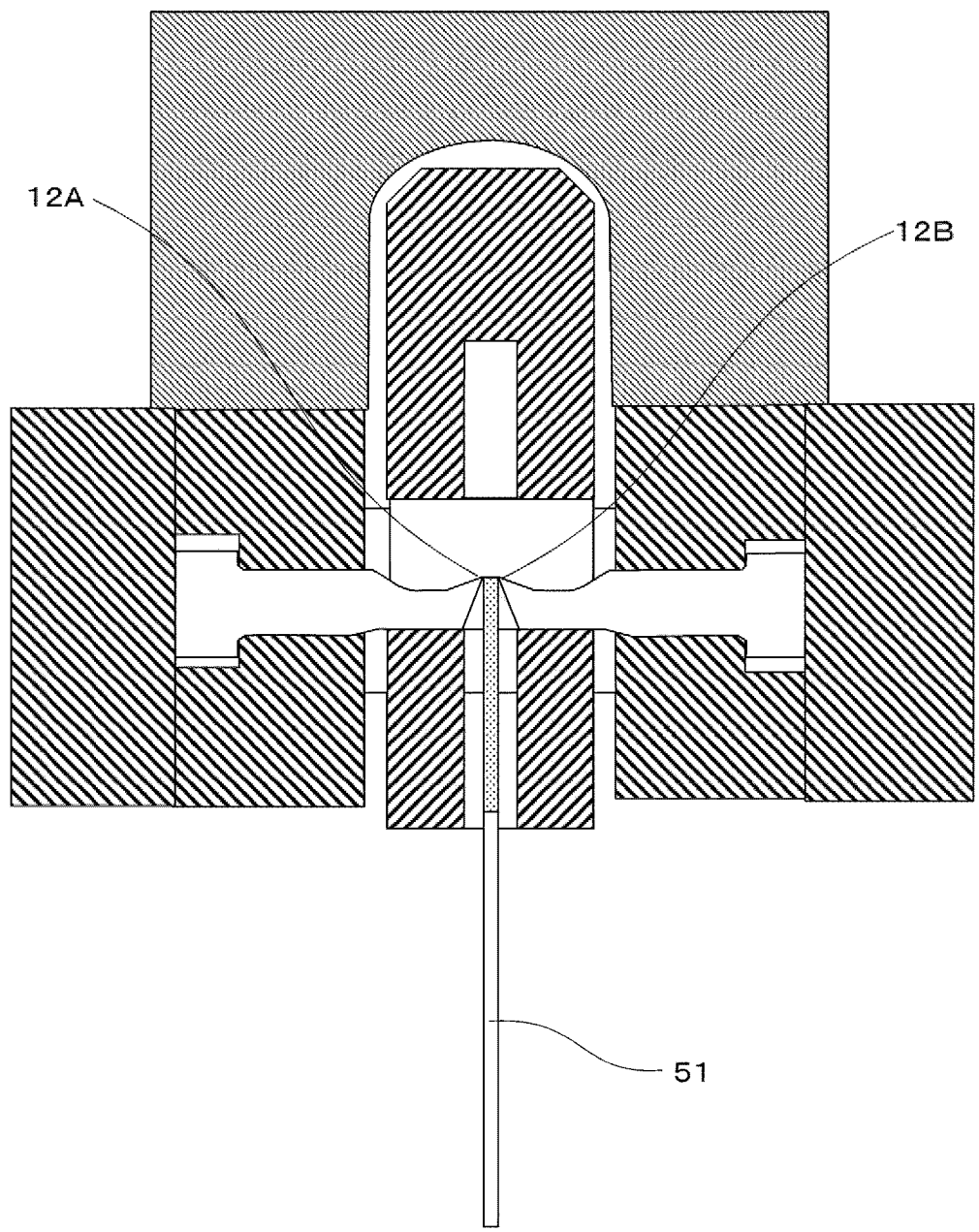

{FIG. 14(A)}
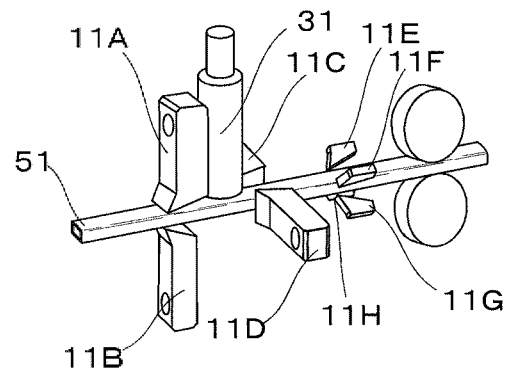
{FIG. 14(B)}
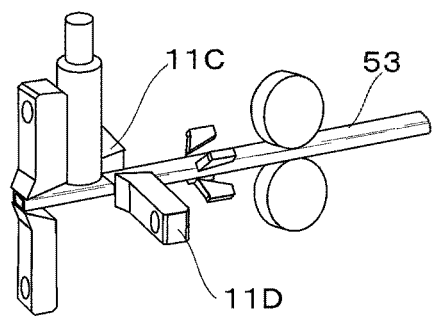
{FIG. 14(C)}
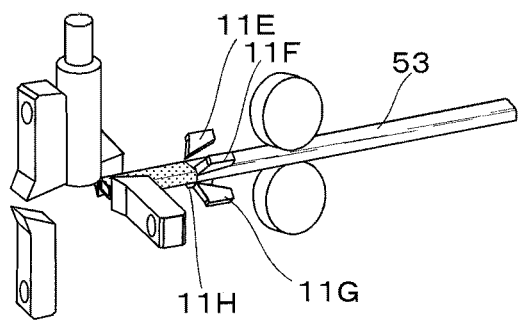
{FIG. 14(D)}
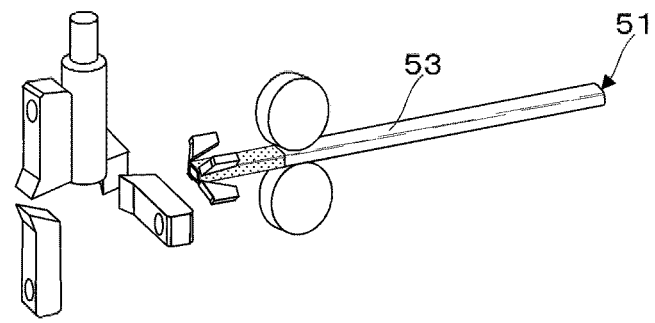

{FIG. 15(A)}
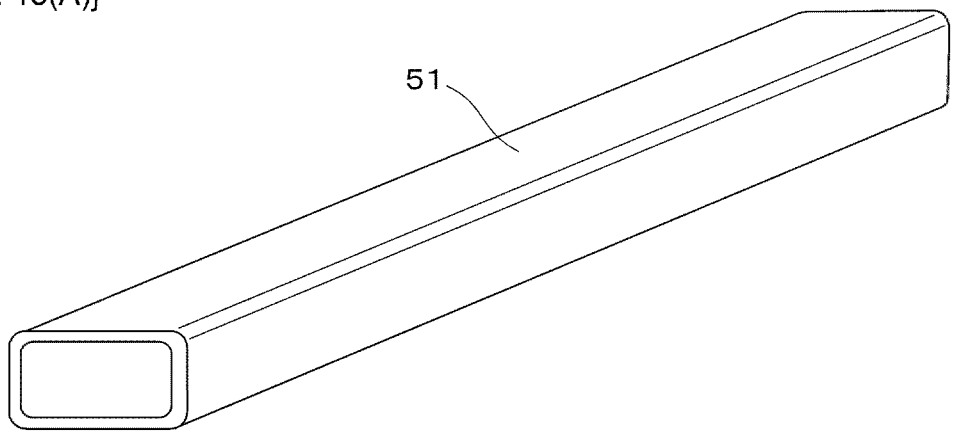
{FIG. 15(B)}
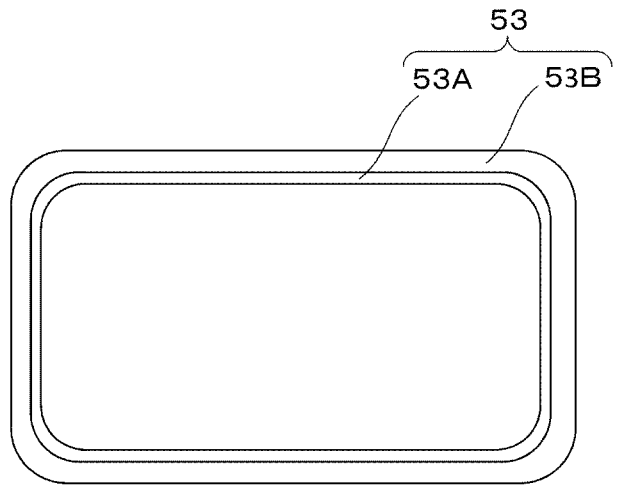

PEELING DEVICE FOR RESIN LAYER COATING RECTANGULAR WIRE

CROSS-REFERENCE TO RELATED APPLICATIONS

This application is a Continuation of PCT International Application No. PCT/JP2021/022089 filed on Jun. 10, 2021, which claims priority under 35 U.S.C. § 119 (a) to Japanese Patent Application No. 2020-165521 filed in Japan on Sep. 30, 2020. Each of the above applications is hereby expressly incorporated by reference, in its entirely, into the present application.

FIELD OF THE INVENTION

The present invention relates to a peeling device for a resin layer coating a rectangular wire, and a method of peeling off a resin layer coating a rectangular wire.

BACKGROUND OF THE INVENTION

A conductor material used in a conventional motor is a round wire in which an insulating resin is attached to an outer periphery of a metal conductor having a round shape in cross section. For peeling off the insulating resin, equipment called a stripper has been generally used. The stripper is configured to include, for example, a processing blade and a jig for holding a round wire.

With the development of technology of an in-vehicle motor and the progress of development of a small-sized high-efficiency motor, there is an increasing demand for a rectangular wire having a polygonal shape in cross section of a conductor with an improved coil space factor. Unlike the round wire, the rectangular wire has planes and corners, and thus processing is difficult with an existing stripper.

Therefore, a technique of punching a resin portion using a tooling (punch and die) (see Patent Literature 1) has been developed and generally used.

CITATION LIST

Patent Literatures

Patent Literature 1: JP-A-2002-209319 ("JP-A" means an unexamined published Japanese patent application)

SUMMARY OF THE INVENTION

Technical Problem

The resin peeling technique using a tooling has an advantage that high-speed and high-accuracy resin peeling processing can be performed on a portion to be processed, and shape formation of a conductor portion can be performed at the same time. However, the cutting blade may contact a conductor line and damage the conductor line. In addition, when a plurality of rectangular wires is simultaneously processed from a configuration using a tooling or a pressing machine, the facility becomes large and the facility cost increases. Further, in the tooling processing, it is difficult to peel off the resin from the same portion on the entire surfaces at the same time in relation to the pressing direction. There is a technical problem that the rectangular wire to be processed also needs to be straight and in a state before shaping (bending or the like).

The present invention provides a peeling device for a resin layer coating a rectangular wire (a resin layer with which a rectangular wire is coated) and a method of peeling off a resin layer coating a rectangular wire, which can peel off the resin layer without damaging a surface of a metal conductor with a processing blade.

Solution to Problem

The above problems of the present invention have been solved by the following means.

[1]
A peeling device for a resin layer coating a rectangular wire in which an outer side of a metal conductor having a rectangular shape in cross section is coated with the resin layer, including:
  a processing blade configured to peel off the resin layer;
  a jig configured to hold the rectangular wire; and
  a position detection means configured to detect a position of a cutting edge of the processing blade with respect to a surface of the metal conductor, in which the cutting edge of the processing blade is caused to penetrate into a predetermined thickness position of the resin layer, and the processing blade and the rectangular wire are relatively moved in a longitudinal direction of the rectangular wire without contact of the cutting edge with the metal conductor to perform treatment of peeling off the resin layer.

[2]
The peeling device for a resin layer coating a rectangular wire described in [1], in which a plurality of the processing blades for simultaneously peeling off a plurality of the resin layers of the rectangular wire is provided.

[3]
The peeling device for a resin layer coating a rectangular wire described in [1] or [2], in which a cutting edge angle of the processing blade is 10° to 80°.

[4]
The peeling device for a resin layer coating a rectangular wire described in [3], in which, in a state where a cutting edge of the processing blade is in contact with a surface to be processed of the rectangular wire, a cutting edge penetration angle of the processing blade defined by an angle formed by a line indicating an angle of ½ of a cutting edge angle of the processing blade and a movement direction of the rectangular wire has a range of 5 to 85°.

[5]
The peeling device for a resin layer coating a rectangular wire described in any one of [1] to [4], in which the jig has a wall surface that holds the rectangular wire, and presses and holds an end surface of the rectangular wire on a tip side in a longitudinal direction against the wall surface.

[6]
The peeling device for a resin layer coating a rectangular wire described in any one of [1] to [5],
in which the resin layer is a thermoplastic resin, and
in which the device includes a heating means configured to heat the cutting edge of the processing blade to a temperature equal to or higher than a softening point and lower than a melting point of the resin layer.

[7]
The peeling device for a resin layer coating a rectangular wire described in any one of [1] to [6], in which the position detection means is a load displacement sensor.

[8]
The peeling device for a resin layer coating a rectangular wire described in any one of [1] to [6], in which the position detection means is an eddy current displacement sensor.

[9]
The peeling device for a resin layer coating a rectangular wire described in any one of [1] to [6],
in which the position detection means includes a conduction sensor that detects presence or absence of electrical conduction between the metal conductor and the processing blade, and
in which the conduction sensor detects a position of the cutting edge of the processing blade on a basis of a change position of presence or absence of electrical conduction between the metal conductor and the processing blade detected by movement of the processing blade.

[10]
The peeling device for a resin layer coating a rectangular wire described in any one of [1] to [9], in which the jig includes a pair of clamp rolls, feeds the rectangular wire sandwiched between the pair of clamp rolls, and straightens the rectangular wire.

[11]
A method of peeling off a resin layer coating a rectangular wire in which an outer side of a metal conductor having a rectangular shape in cross section is coated with the resin layer, including, when the resin layer is peeled off with a processing blade:
holding the rectangular wire with a jig;
detecting a position of a cutting edge of the processing blade with respect to a surface of the metal conductor with a position detection means; and
causing the cutting edge of the processing blade to penetrate into a predetermined thickness position of the resin layer, and relatively moving the processing blade and the rectangular wire in a longitudinal direction of the rectangular wire without contact of the cutting edge with the metal conductor, and leaving at least a part of the resin layer in form of a layer on a surface side of the metal conductor to perform treatment of peeling off the resin layer other than the remaining layer.

[12]
The method of peeling off a resin layer coating a rectangular wire described in [11], containing using the peeling device for a resin layer coating a rectangular wire described in any one of [1] to [10].

Advantageous Effects of Invention

In the peeling device for a resin layer coating a rectangular wire according to the present invention, the position of a cutting edge of a processing blade can be accurately detected by a position detection means, so that while a resin layer (hereinafter, also referred to as "coating resin layer") is left in the form of a layer on the surface of a metal conductor by the processing blade, the other coating resin layer can be peeled off without damaging the surface of the metal conductor. In addition, the peeling facility can be reduced in size.

In the method of peeling off a resin layer coating a rectangular wire according to the present invention, the position of a cutting edge of a processing blade is accurately detected, so that while a coating resin layer is left in the form of a layer on the surface of a metal conductor, the other coating resin layer can be peeled off without damaging the surface of the metal conductor.

BRIEF DESCRIPTION OF THE DRAWINGS

FIG. 1 is a view illustrating a main part of a peeling device for a resin layer coating a rectangular wire according to the present invention, and is a main part front view illustrating a preferred example of a positional relationship between a processing blade, a position detection means, and a rectangular wire including a coating resin layer. Note that the coating resin layer is shown in cross section.

FIG. 2 is a main part front view illustrating a relationship between a cutting edge angle of a processing blade and a cutting edge penetration angle α. Note that the coating resin layer is shown in cross section.

FIG. 3 is a main part front view illustrating an example of one penetration amount of a processing blade. Note that the coating resin layer is shown in cross section.

FIG. 4 is a front view illustrating a preferred aspect of a jig in the present invention.

FIG. 5 is a front view illustrating a preferred aspect of clamp rolls. Note that the coating resin layer is shown in cross section.

FIG. 6 is a main part front view illustrating a preferred aspect in which upper and lower two surfaces of a coating resin layer are simultaneously peeled off. Note that the coating resin layer is shown in cross section.

FIG. 7 is a perspective view illustrating an example of a rectangular wire from which upper and lower two surfaces of a coating resin layer are simultaneously peeled off.

FIG. 8 is a main part perspective view illustrating a preferred aspect in which four surfaces of upper and lower surfaces and left and right side surfaces of a coating resin layer are simultaneously peeled off.

FIG. 9 is a perspective view illustrating an example of a rectangular wire from which four surfaces of upper and lower surfaces and left and right side surfaces of a coating resin layer are simultaneously peeled off.

FIG. 10 is a main part perspective view illustrating a preferred aspect in which chamfered portions of a rectangular wire are simultaneously peeled off.

FIG. 11 is a perspective view illustrating an example of a rectangular wire from which four surfaces of upper and lower surfaces and left and right side surfaces and chamfered portions of a coating resin layer are simultaneously peeled off.

FIG. 12 is a main part front view illustrating an example of a fixing mode of a processing blade.

FIG. 13 is a main part front view illustrating an example of a fixing mode of a processing blade after peeling of a coating resin layer.

FIGS. 14(A) to 14(D) each are a main part perspective view illustrating a preferable example in which a coating resin layer of upper and lower surfaces, left and right side surfaces, and chamfered portions of a metal conductor are sequentially peeled off.

FIG. 15(A) is a perspective view illustrating an example of a rectangular wire used in EXAMPLES, and FIG. 15(B) is an enlarged view illustrating an end surface of the rectangular wire shown in FIG. 15(A).

DESCRIPTION OF EMBODIMENTS

Preferred embodiments of a peeling device for a resin layer coating a rectangular wire according to the present invention will be described below with reference to the drawings.

As shown in FIG. 1, a peeling device for a resin layer coating a rectangular wire 1 according to the present invention includes a processing blade 11 for peeling off a coating resin layer 53 coating a metal conductor 52 of a rectangular wire 51. In addition, a jig 21 (see FIG. 4) that holds the rectangular wire 51 is provided. Further, a position detection means 31 that detects the position of a cutting edge 12 of the processing blade 11 with respect to a metal conductor surface 52SA is included.

The metal conductor 52 has, for example, a rectangular (for example, rectangular flat) shape in cross section, and is made of copper, a copper alloy, aluminum, an aluminum alloy, or the like. The "rectangular" also means a metal conductor having a polygonal (triangular or more) shape in cross section, and having a periphery formed of a plurality of planes and corners between the planes. The corners may be chamfered.

For example, the rectangular wire 51 is coated with the coating resin layer 53 including at least one or more insulating resin layers (two coating resin layers 53A and 53B in the drawings) on the outer side of the metal conductor 52 having a quadrangular shape (chamfered rectangle) in cross section as illustrated. The coating resin layer 53 may be a multi-layer structure or a single-layer structure. When the coating resin layer 53 is a multi-layer structure, the layer on the side of the metal conductor 52 is preferably an insulating thermoplastic resin. When the thickness of the coating resin layer 53 is uniform, similarly to the metal conductor 52, the rectangular wire 51 also has a periphery formed of a plurality of planes and corners between the planes.

The plane of the rectangular wire 51 described above is a plane region of the rectangular wire 51, meaning a region that is flanked by the corners and extends in the longitudinal direction of the rectangular wire 51. That is, it is a portion excluding the corners. In other words, in the cross section (cross section orthogonal to the longitudinal direction) of the rectangular wire 51, it means a portion that forms a side excluding the corners of a polygon showing the cross section. The corners may or may not be chamfered.

As shown in FIG. 2, the processing blade 11 described above preferably has a cutting edge angle β of 10° to 80°.

In addition, it is preferable that, in a state where the cutting edge 12 of the processing blade 11 is in contact with a surface 51SA (coating resin layer surface 53SA) of the rectangular wire 51, the cutting edge penetration angle α of the processing blade 11 defined by the angle formed by a line L indicating the angle of ½ of the cutting edge angle β of the processing blade 11 and the rectangular wire surface 51SA in the movement direction (arrow A) of the rectangular wire 51 has a range of 5 to 85°. Thus, the coating resin layer 53 other than the coating resin layer 53 left on the surface of the metal conductor 52 can be peeled off. From this viewpoint, the cutting edge penetration angle α is more preferably 20 to 70°, still more preferably 35 to 55°.

In addition, the blade width of the processing blade 11 is preferably longer than the width of the rectangular wire 51. By setting the blade width of the processing blade 11 in this manner, the coating resin layer 53 on one surface of the rectangular wire 51 can be peeled off at a time by one peeling operation.

Further, although not illustrated, it is also preferable that a plurality of processing blades 11 is provided in parallel and the coating resin layer 53 of each of a plurality of rectangular wires 51 is simultaneously peeled off by each processing blade 11.

The coating resin layer 53 described above is preferably a thermoplastic resin, and a heating means (not illustrated) that heats the cutting edge 12 of the processing blade 11 to a temperature equal to or higher than the softening point and lower than the melting point of the coating resin layer 53 is preferably included. As described above, in the case of thermoplastic resin, the thermoplastic resin is not thermally cured when heated, and favorable cutting becomes possible.

In addition, when the coating resin layer 53 described above has a plurality of layers, the cutting edge 12 is preferably heated to a temperature equal to or higher than the softening point and lower than the melting point of the layer to be cut by the cutting edge 12 of the processing blade 11.

Note that in a case where the cutting edge 12 of the processing blade 11 is heated, when the coating resin layer 53 is a thermosetting resin, the coating resin layer 53 is cured when heat is applied by the cutting edge 12, and there is a possibility that cutting performance is deteriorated. Therefore, when the cutting edge 12 is heated, the coating resin layer 53 is preferably a thermoplastic resin.

Although not illustrated, the heating means for heating the cutting edge 12 can be appropriately selected and employed from various heating methods such as a method of heating by attaching a heater to the cutting edge, a method of blowing hot air to the cutting edge 12, and a method of emitting heat rays.

In addition, it is also preferable not to heat the cutting edge 12, but to heat the position of the coating resin layer 53 to be processed by a method similar to the method for heating the cutting edge 12. In addition, it is also preferable to heat both the cutting edge 12 and the position of the coating resin layer 53 to be processed by the method described above.

The surface to be peeled off may be one of a plurality of surfaces of the rectangular wire 51, or may be a plurality of surfaces—two or more surfaces. The case of simultaneously peeling off a plurality of surfaces will be described below.

As shown in FIG. 3, a penetration depth d of the cutting edge 12 of the processing blade 11 with respect to the coating resin layer surface 53SA is obtained in the manner described below. First, while a measurement distance D from the metal conductor surface 52SA to the cutting edge 12 of the processing blade 11 is measured with the position detection means 31 so that the distance from the metal conductor surface 52SA to the cutting edge 12 of the processing blade 11 becomes a set distance, the position of the cutting edge 12 is determined so that [measurement distance D]=[set distance]. The set distance described above corresponds to the thickness of the coating resin layer 53 remaining on the metal conductor surface 52SA after cutting the coating resin layer 53. Therefore, the penetration depth d of the cutting edge 12 of the processing blade 11 is obtained by [penetration depth d]=[thickness T of coating resin layer 53]−[measurement distance D].

Thus, since the penetration depth d of the cutting edge 12 with respect to the coating resin layer 53 can be precisely set, for example, the coating resin layer 53A can be left thin on the metal conductor surface 52SA and the coating resin layer 53 other than the remaining can be peeled off. Therefore, the metal conductor surface 52SA is not damaged when the coating resin layer 53 is peeled off.

As shown in FIG. 4, the jig 21 described above preferably includes a jig 21A that holds an end of the rectangular wire 51 and jigs 21B and 21C that hold side surfaces facing each other in the longitudinal direction of the rectangular wire 51.

The jig 21A determines the position of an end surface 51E of the rectangular wire 51 when the rectangular wire 51 is installed in the peeling device. For example, the end surface 51E of the rectangular wire 51 on the tip side in the longitudinal direction can be pressed against and held on a wall surface of the jig 21A. In addition, a recess (not illustrated) complementary to the cross-sectional shape of the rectangular wire 51 may be formed. In such a case, it is also preferable to fit an end of the rectangular wire 51 into the recess.

It is preferable that the jigs 21B and 21C sandwich and hold the opposite side surfaces (for example, rectangular wire surfaces 51SA and 51SB) of the rectangular wire 51 in the longitudinal direction of the rectangular wire with holding surfaces 21BS and 21CS of the jigs by pressing the holding surfaces 21BS and 21CS against the side surfaces. Therefore, it is preferable that the jig 21B is movable in the direction of arrow B, and the jig 21C is movable in the direction of arrow C. In addition, it is preferable that the jigs 21B and 21C can linearly move on the rectangular wire 51, for example, in the direction of arrow A with the side surfaces of the rectangular wire 51 sandwiched therebetween. In order to linearly move the jigs 21B and 21C, it is preferable that the jigs 21B and 21C are movably arranged on rails, which are not illustrated, that are linearly provided in the direction of arrow A. The moving means of each of the jigs 21B and 21C described above may be manual, electric, or another moving means.

Note that FIG. 4 illustrates a state prior to the peeling of the coating resin layer 53.

In addition, as shown in FIG. 5, the jig 21 preferably includes a pair of clamp rolls 22 and 23. The pair of clamp rolls 22 and 23 can feed the rectangular wire 51 in the moving direction of the direction of arrow A and straighten the rectangular wire 51 by sandwiching the rectangular wire 51 therebetween and when the clamp roll 22 rotates in an arrow direction C1 and the clamp roll 23 rotates in an arrow direction C2. As described above, by straightening the rectangular wire 51 after peeling of the coating resin layer 53, handling of the rectangular wire 51 after peeling is facilitated.

The position detection means 31 shown in FIG. 1 described above is preferably a load displacement sensor. It is preferable that the load displacement sensor utilizes a difference in hardness between the metal conductor 52 and the coating resin layer 53, and detects the position of the cutting edge of the processing blade 11 with respect to the metal conductor surface 52SA by a change in load sensed by the load displacement sensor due to resistance when the processing blade 11 is inserted into the coating resin layer 53 of the rectangular wire 51.

The position detection means 31 is also preferably an eddy current displacement sensor. The eddy current displacement sensor preferably generates an AC magnetic field using a high frequency current, generates an eddy current by a magnetic flux change inside the conductor surface, and measures the position of the cutting edge and the metal conductor surface 52SA on the basis of the value of the generated eddy current.

The position detection means 31 is preferably a conduction sensor that detects the presence or absence of electrical conduction between the metal conductor 52 and the processing blade 11. The conduction sensor detects the position of the cutting edge 12 of the processing blade 11 on the basis of the position at which conduction has started depending on the presence or absence of electrical conduction between the metal conductor 52 and the processing blade 11 detected by movement of the processing blade 11 in the direction of the metal conductor 52.

When the coating resin layer 53 is peeled off, after the position of the surface of the metal conductor 52 is detected by the position detection means 31, the cutting edge 12 is slightly separated from the metal conductor surface 52SA, and then the coating resin layer 53 is peeled off. The distance over which the cutting edge 12 is separated from the metal conductor surface 52SA can be appropriately set.

In addition, the position detection means 31 can also detect the position of the cutting edge 12 of the processing blade 11 with respect to the metal conductor surface 52SA to enable control even during the peeling treatment.

The peeling device 1 described above performs treatment of peeling off the coating resin layer by causing the cutting edge 12 of the processing blade 11 to penetrate into a predetermined penetration depth of the coating resin layer 53 and relatively moving the processing blade 11 and the rectangular wire 51 in the longitudinal direction of the rectangular wire 51 without contact of the cutting edge 12 of the processing blade 11 with the metal conductor 52. Here, "relatively moving in the longitudinal direction of the rectangular wire 51" means that one or both of the processing blade 11 and the rectangular wire 51 are moved in the longitudinal direction, and the processing blade 11 is moved a predetermined length from the predetermined penetration depth. When both the processing blade 11 and the rectangular wire 51 are moved, the processing blade 11 and the rectangular wire 51 are moved in opposite directions along the longitudinal direction of the rectangular wire 51.

In addition, the surface to be peeled off may be one plane among the plurality of surfaces of the rectangular wire 51 or may be at least two or more, a plurality of opposing surfaces. When the plurality of surfaces is subjected to the peeling treatment, it is preferable to perform the peeling treatment on the coating resin layer 53 at the same position from the end surface of the rectangular wire 51 of the facing surfaces (for example, upper and lower surfaces). The upper and lower surfaces refer to an upper surface (one surface) and a lower surface (a surface opposed to the one surface) opposed to the upper surface when the rectangular wire 51 is disposed on the jig 21. By installing the processing blade on each peeling surface of the coating resin layer 53, a plurality of coating resin layers can be simultaneously peeled off.

For example, as shown in FIG. 6, it is possible to cut a plurality of surfaces of the rectangular wire 51, for example, the coating resin layer 53 of the two surfaces of upper and lower surface sides. That is, a processing blade 11A is disposed so that a cutting edge 12A faces the upper surface-side coating resin layer 53 of the rectangular wire 51. At this time, it is preferable to dispose a processing blade 11B on the lower surface side of the rectangular wire 51 so that a cutting edge 12B faces the coating resin layer 53 side at a position facing the processing blade 11A. The position detection means 31 is preferably disposed on one of the processing blades 11 (for example, the processing blade 11A). Of course, the position detection means 31 may be disposed on both the processing blades 11A and 11B. On the other hand, when the position detection means 31 is on one side, it is preferable to interlock the penetration depths of the processing blades (the processing blade 11A and the processing blade 11B in the drawings) into the coating resin layer 53.

As described above, by disposing the processing blades 11 (11A and 11B) on the upper and lower sides across the coating resin layer 53, the upper surface-side and lower surface-side two coating resin layers 53 of the metal conductor 52 can be peeled off as shown in FIG. 7.

As described above, with the peeling device 1, since the processing blade 11 can penetrate into a predetermined penetration depth of the coating resin layer 53, the coating resin layer 53 can be subjected to the peeling treatment without damaging the surface of the metal conductor 52. It is also preferable to perform the peeling treatment by detecting the penetration depth of the cutting edge 12 of the processing blade 11 with respect to the coating resin layer 53 with the position detection means 31 and controlling the penetration depth. On the surface of the metal conductor 52 from which the coating resin layer 53 has been peeled off, it is preferable that a coating resin layer 53S remains to be thin, for example, about 5 μm in thickness. Note that the thickness of the remaining coating resin layer 53 can be appropriately set. For example, the remaining coating resin layer 53S may be a lower layer side or the whole of a layer directly coating the metal conductor 52.

As shown in FIG. 8, four surfaces of the coating resin layer 53: the upper surface side, the lower surface side, the right side surface side, and the left side surface side can be cut. That is, the processing blade 11A is disposed on the upper surface side of the coating resin layer 53 so that the cutting edge 12A faces the coating resin layer 53 side. At this time, it is preferable to dispose the processing blade 11B on the lower surface side of the rectangular wire 51 so that the cutting edge 12B faces the coating resin layer 53 side at a position facing the processing blade 12A. Further, it is preferable that processing blades 11C and 11D are disposed on the left and right side surface sides of the rectangular wire 51 so that the cutting edges faces the coating resin layer 53 side. It is sufficient to dispose the position detection means 31 on at least one of the processing blades 11 (for example, the processing blade 11A). When there is one position detection means 31, it is preferable to interlock the penetration depths of the processing blades into the coating resin layer 3. Of course, the position detection means 31 may also be disposed on the processing blade 11C or the position detection means 31 may be disposed on all the processing blades 11.

In this manner, by disposing the processing blade 11 on the upper and lower surface sides and the left and right side surface sides across the coating resin layer 53, as shown in FIG. 9, the coating resin layer 53 can be peeled off from the four surfaces of the metal conductor 52: the upper and lower surface sides and the left and right side surface sides. In this case, the coating resin layer 53S is left on each surface similarly to the aspect shown in FIG. 7 described above.

In addition, although not illustrated, it is also preferable to peel off the coating resin layer 53 coated on the chamfered corners of the metal conductor 52. In this case, as shown in FIG. 10, it is preferable to dispose processing blades 11E to 11H at an angle (for example, the state where the cutting edge is inclined by 45° in the blade width direction) for contact with the chamfered portions of the metal conductor 52. In this case, it is allowable even when a part of the chamfered portions of the metal conductor 52 is cut by the processing blades 11E to 11H since the cut amount is a small amount. Therefore, the coating resin layer 53 may be cut so as to expose a part of the chamfered corners of the metal conductor 52. In this way, as shown in FIG. 11, the coating resin layer at the chamfered corners of the metal conductor 52 is removed, and the coating resin layer at the corners can be peeled off by performing the treatment of peeling off the coating resin layer 53 while preventing damage to the metal conductor 52 on the upper and lower surface sides and the left and right side surface sides of the rectangular wire 51.

As shown in FIG. 12, the rectangular wire 51 is fixed by the jigs described with reference to FIG. 4 described above. The processing blades 11A and 11B are disposed on both sides of the rectangular wire fixed by the jigs. The processing blades 11A and 11B are disposed on the upper surface side (the left side of the rectangular wire in the drawing) and the lower surface side (the right side of the rectangular wire in the drawing) of the rectangular wire 51.

It is preferable that the processing blades 11A and 11B are held by processing blade holders 41A and 41B, respectively. Each of the processing blade holders 41A and 41B can be positioned in the direction of the rectangular wire 51. Therefore, the distances between the cutting edge 12A of the processing blade 11A, the cutting edge 12B of the processing blade 11B, and the metal conductor surface 52SA of the rectangular wire 51 (see FIG. 1) can be measured by the position detection means 31, which is not illustrated. Then, it is preferable to set the positions of the cutting edges 12A and 12B from the surface of the metal conductor (not illustrated) to be at desired distances by moving the processing blade holders 41A and 41B in a direction perpendicular to the longitudinal direction of the rectangular wire on the basis of the measured values. The positions of the processing blade holders 41A and 41B can be adjusted so that the positions of the cutting edges 12A and 12B are disposed at positions appropriately spaced from the metal conductor surface (for example, a position spaced by 5 μm).

The processing blade holders 41A and 41B described above are preferably coupled and fixed by a holder coupling portion 42 such that the processing blades 11A and 11B move simultaneously.

Then, as shown in FIG. 13, the rectangular wire 51 is moved downward in the drawing. That is, in a state where the cutting edges 12A and 12B are cut into the coating resin layer (not illustrated) of the rectangular wire 51, the rectangular wire 51 and the processing blades 11A and 11B are relatively moved in the longitudinal direction of the rectangular wire 51 to peel off the coating resin layer. At that time, it is preferable that the coating resin layer is peeled off so that the processing blades 11A and 11B do not come into contact with the metal conductor 52. That is, it is preferable that the coating resin layer is not completely peeled off from the surface of the metal conductor (not illustrated), but the coating resin layer is peeled off so that a thin layer of the coating resin layer remains on the surface of the metal conductor (see FIGS. 6 to 9).

As shown in FIGS. 10, 12, and the like described above, with the peeling device for a resin layer coating a rectangular wire 1 according to the present invention, the peeling device can be configured to be compact by fixedly disposing the processing blades 11A to 11H on the processing blade holders that are movable in the direction of the coating resin layer. In addition, since the position of the cutting edge of the processing blade can be detected by the position detection means attached to the processing blade, the peeling device 1 is configured to be compact also in this respect. For example, a size with which the peeling treatment can be manually performed is preferable, and the peeling device may be operated in a state of being placed on a table or in a state of being suspended. By suspending the peeling device, the weight of the peeling device applied to the operator is reduced, and the peeling operation is easily performed. The peeling device can be configured to have a size of, for example, about 20 to 50 cm×20 to 50 cm×20 to 50 cm and a weight of about 15 to 30 kg. Therefore, the size of the peeling device 1 can be reduced.

Next, the method of peeling off a coating resin layer according to the present invention will be described below.

The method of peeling off a coating resin layer according to the present invention is a method of peeling off the coating resin layer 53 of the rectangular wire 51 in which the outer side of the metal conductor 52 having a rectangular shape in cross section is coated with the coating resin layer 53. When the coating resin layer 53 is peeled off by the processing blade 11, the rectangular wire 51 is held by the jigs 21, and the position detection means 31 detects the position of the cutting edge 12 of the processing blade 11 with respect to the metal conductor surface 52SA. Then, the cutting edge 12 of the processing blade 11 is caused to penetrate into a predetermined thickness position of the coating resin layer 53, and the processing blade 11 and the rectangular wire 51 are relatively moved in the longitudinal direction of the rectangular wire 51 without contact of the cutting edge with the metal conductor 52 to perform the treatment of peeling off the coating resin layer 53 on the surface side of the metal conductor 52. For example, at least a part of the coating resin layer 53 is left in the form of a layer, and the coating resin layer 53 other than the remaining layer is peeled off. The relative movement means that the rectangular wire 51 may be moved, the processing blade 11 may be moved, or both may be moved.

At that time, it is preferable that the distance between the cutting edge 12 of the processing blade 11 and the metal conductor 52 is detected by the position detection means 31 and a constant desired distance is always maintained. Thus, it is possible to peel off the coating resin layer 53 while leaving a thin coating resin layer 53 (for example, about 5 μm thick) on the metal conductor surface 52SA without damaging the metal conductor surface 52SA. The thickness of the coating resin layer 53 remaining on the surface of the metal conductor 52 is appropriately set. As described above, by peeling off the coating resin layer 53 so as to remain thin, it is possible to prevent the processing blade 11 from damaging the metal conductor surface 52SA in the processing of peeling off the coating resin layer.

For example, a preferable example of the case of peeling off the coating resin layer 53 of the upper and lower surfaces, the left and right side surfaces, and the corners of the metal conductor 52 will be described below with reference to FIG. 14.

For example, a case where the coating resin layer 53 is coated from the middle of the rectangular wire 51 to the tip portion of the rectangular wire 51 will be described.

As shown in FIG. 14(A), the rectangular wire 51 is disposed between the processing blades 11A and 11B, between the processing blades 11C and 11D, and between the processing blades 11E to 11H. Then, for example, the penetration depth of the cutting edge 12A of the processing blade 11A is set by the position detection means. At the same time, the penetration depth of the cutting edge 12B of the processing blade 11B is also set. The coating resin layer 53 of the upper and lower surfaces of the rectangular wire 51 is peeled off at the set penetration depth. Then, as shown in FIG. 14(B), the penetration depths of the processing blades 11C and 11D are set in the coating resin layer 53 coating the left and right sides of the metal conductor 52 (not illustrated) when the peeling start position is located at the cutting edge positions of the processing blades 11C and 11D. The coating resin layer 53 of the left and right side surfaces of the rectangular wire 51 is peeled off at the set penetration depth. Further, as shown in FIG. 14(C), the penetration depths of the processing blades 11E to 11H are set in the coating resin layer 53 coating the corners of the metal conductor 52 (not illustrated) when the peeling start position is located at the cutting edge positions of the processing blades 11E to 11H. As shown in FIG. 14(D), the coating resin layer 53 of the corners of the rectangular wire 51 is peeled off at the set penetration depth.

In this way, the coating resin layer at a desired position of the rectangular wire 51 can be peeled off without damaging the metal conductor surface 52SA (see FIG. 1). The rectangular wire 51 from which the coating resin layer 53 has been peeled off can be used by directly welding the peeled portion or the like.

In the peeling method described above, it is preferable to leave at least a part of the coating resin layer 53 in the form of a layer on the surface side of the metal conductor 52 and peel off the coating resin layer other than the remaining layer by using the peeling device for the coating resin layer 1 according to the present invention.

The present invention will be described in more detail based on Examples given below. However, it is to be noted that the present invention is not limited to the following Examples.

EXAMPLES

Example 1

A rectangular wire 51 in which an insulating resin layer having a thickness of 200 μm, which is the coating resin layer 53, was coated on upper, lower, left, and right four surfaces in a cross section of a metal conductor (copper rectangular wire) having a square shape of 2×3 mm in cross section was prepared. As the coating resin layer 53 shown in FIG. 15, an insulating resin layer having a two-layer structure: an enamel resin layer having a thickness of 50 μm: a coating resin layer 53A (lower layer side: see, for example, FIG. 1) and a polyetheretherketone (PEEK) resin layer having a thickness of 150 μm: a coating resin layer 53B (upper layer side: see, for example, FIG. 1) was used. The coating resin layers were peeled off from the rectangular wire using the peeling device for the resin layer coating the rectangular wire 1 shown in FIG. 10. First, the rectangular wire was positioned for the rectangular wire using the holding surfaces of the jigs of the peeling device. Then, the position of the cutting edge of the processing blade with respect to the position of the surface of the metal conductor was confirmed using an eddy current displacement sensor as the position detection means. As the eddy current displacement sensor, EX-305V (trade name) manufactured by KEYENCE CORPORATION was used. A processing blade having a cutting edge angle of 50° was set to have a cutting edge penetration angle of 45° with respect to the rectangular wire, and the cutting edge was caused to penetrate to 5 μm above the surface of the metal conductor. Then, by moving the rectangular wire in the longitudinal direction with a force of 150 N or more, the coating resin layer of the rectangular wire into which the processing blade has been inserted was peeled off while leaving a thickness of 5 μm. The force of 150 N or more was measured by using FGPX-100 (trade name) manufactured by NIDEC-SHIMPO CORPORATION. At that time, since the coating resin layer having a thickness of 5 μm was left on the surface of the metal conductor, the surface of the metal conductor was not damaged.

Example 2

In Example 2, the same processing as in Example 1 was performed except that a jig having a holding surface capable of holding a plurality of rectangular wires was used as the jig of the coating resin layer peeling device 1, so that the coating resin layer having a thickness of 5 μm was left on the surfaces of the metal conductors simultaneously on the plurality of rectangular wires and the other coating resin layer was peeled off. At that time, since the coating resin layer having a thickness of 5 μm was left on the surface of the metal conductor, the surface of the metal conductor was not damaged.

The present invention has been described as related to the present embodiments. It is our intention that the invention not be limited by any of the details of the description unless otherwise specified, but rather be construed broadly within its spirit and scope as set out in the attached claims.

DESCRIPTION OF SYMBOLS

1 Peeling device for resin layer coating rectangular wire, peeling device
11 Processing blade
12 Cutting edge
21 Jig
22, 23 Clamp roll
31 Position detection means
51 Rectangular wire
52 Metal conductor
52SA Metal conductor surface
53 Coating resin layer
α Cutting edge penetration angle
β Cutting edge angle

The invention claimed is:

1. A peeling device for a resin layer coating a rectangular wire in which an outer side of a metal conductor having a rectangular shape in cross section and having chamfered corners is coated with the resin layer comprising:
a processing blade configured to peel off the resin layer;
a jig configured to hold the rectangular wire; and
a position detector configured to detect a position of a cutting edge of the processing blade with respect to a surface of the metal conductor,
wherein the cutting edge of the processing blade is caused to penetrate into a predetermined thickness position of the resin layer, and the processing blade and the rectangular wire are relatively moved in a longitudinal direction of the rectangular wire without contact of the cutting edge with the metal conductor to perform treatment of peeling off the resin layer, and
wherein the processing blade includes
a pair of upper and lower processing blades disposed to face the upper and lower surface-side coating resin layers of the rectangular wire,
a pair of left and right processing blades disposed, behind the pair of upper and lower processing blades, to face the left and right surface-side coating resin layers of the rectangular wire, and
four chamfered-corner processing blades disposed, behind the pair of left and right processing blades, to face chamfered-corner coating resin layers of the rectangular wire.

2. The peeling device for a resin layer coating a rectangular wire according to claim 1, wherein a plurality of the processing blades for simultaneously peeling off a plurality of the resin layers of the rectangular wire is provided.

3. The peeling device for a resin layer coating a rectangular wire according to claim 1, wherein a cutting edge angle of the processing blade is 10° to 80°.

4. The peeling device for a resin layer coating a rectangular wire according to claim 3, wherein, in a state where a cutting edge of the processing blade is in contact with a surface to be processed of the rectangular wire, a cutting edge penetration angle of the processing blade defined by an angle formed by a line indicating an angle of ½ of a cutting edge angle of the processing blade and a movement direction of the rectangular wire has a range of 5 to 85°.

5. The peeling device for a resin layer coating a rectangular wire according to claim 1, wherein the blade width of the processing blade is longer than the width of the rectangular wire.

6. The peeling device for a resin layer coating a rectangular wire according to claim 1, wherein the jig has a wall surface that holds the rectangular wire, and presses and holds an end surface of the rectangular wire on a tip side in a longitudinal direction against the wall surface.

7. The peeling device for a resin layer coating a rectangular wire according to claim 1,
wherein the resin layer is a thermoplastic resin, and
wherein the device comprises a heating means configured to heat the cutting edge of the processing blade to a temperature equal to or higher than a softening point and lower than a melting point of the resin layer.

8. The peeling device for a resin layer coating a rectangular wire according to claim 1, wherein the metal conductor is made of copper, a copper alloy, aluminum, or an aluminum alloy.

9. The peeling device for a resin layer coating a rectangular wire according to claim 1, wherein the position detection means is a load displacement sensor.

10. The peeling device for a resin layer coating a rectangular wire according to claim 1, wherein the position detection means is an eddy current displacement sensor.

11. The peeling device for a resin layer coating a rectangular wire according to claim 1,
wherein the position detection means comprises a conduction sensor that detects presence or absence of electrical conduction between the metal conductor and the processing blade, and
wherein the conduction sensor detects a position of the cutting edge of the processing blade on a basis of a change position of presence or absence of electrical conduction between the metal conductor and the processing blade detected by movement of the processing blade.

12. The peeling device for a resin layer coating a rectangular wire according to claim 1,
wherein the position detection means measures a penetration depth of the cutting edge of the processing blade with respect to the surface of the resin layer, and
wherein the position detection means detects the position of the cutting edge of the processing blade with respect to the surface of the metal conductor to enable control during peeling treatment of the resin layer.

13. The peeling device for a resin layer coating a rectangular wire according to claim 1, wherein the jig holds an end of the rectangular wire and side surfaces facing each other in the longitudinal direction of the rectangular wire.

14. The peeling device for a resin layer coating a rectangular wire according to claim 1, wherein the jig comprises a pair of clamp rolls, feeds the rectangular wire sandwiched between the pair of clamp rolls, and straightens the rectangular wire.

15. The peeling device for a resin layer coating a rectangular wire according to claim 1, wherein the rectangular wire is used for an in-vehicle motor.

* * * * *